United States Patent
Woolstencroft (10) Patent No.: US 6,902,800 B2
(45) Date of Patent: Jun. 7, 2005

(54) COMPOSITE (75) Inventor: David Harold Woolstencroft, Poulton-le-Fylde (GB)

(73) Assignee: cytec Technology Corp., Wilmington, DE (US)

(*) Notice: Subject to any disclaimer, the term of this patent is extended or adjusted under 35 U.S.C. 154(b) by 106 days.

(21) Appl. No.: 10/381,540

(22) PCT Filed: Sep. 27, 2001

(86) PCT No.: PCT/GB01/04353
§ 371 (c)(1), (2), (4) Date: Mar. 25, 2003

(87) PCT Pub. No.: WO02/28623
PCT Pub. Date: Apr. 11, 2002

(65) Prior Publication Data
US 2004/0028884 A1 Feb. 12, 2004

(51) Int. Cl.$^7$ ................................................ B32B 5/22
(52) U.S. Cl. ................................ 428/317.9; 428/294.7; 428/373; 428/375; 428/396; 264/112; 264/171.1; 264/122; 264/480
(58) Field of Search .......................... 428/317.9, 373, 428/294.7, 374, 296.1, 119, 120; 264/112, 122, 171.1, 480; 52/273; 156/71, 92

(56) References Cited

U.S. PATENT DOCUMENTS 4,911,718 A * 3/1990 Lee et al. ................. 623/17.15
5,132,394 A * 7/1992 Bockrath ................... 528/353
5,624,386 A * 4/1997 Tailor et al. ................ 602/16
5,910,361 A * 6/1999 Guevel et al. .............. 428/364
6,003,276 A * 12/1999 Hegemier et al. ............ 52/273
6,237,292 B1 * 5/2001 Hegemier et al. ............ 52/273
6,616,971 B2 * 9/2003 Evans .................... 427/249.3
6,716,776 B2 * 4/2004 Morishima et al. ......... 442/104

FOREIGN PATENT DOCUMENTS

| EP | 0 539 996 | 10/1992 |
|---|---|---|
| GB | 2 323 322 | 9/1998 |
| JP | 04249152 | 4/1992 |

* cited by examiner

Primary Examiner—Merrick Dixon
(74) Attorney, Agent, or Firm—Fran Wasserman; Robert Neller (57) ABSTRACT

A composite comprising a structural component and a matrix component, the structural component comprising structural fibers and a toughening additive comprising non structural fibers of a first thermoplastic material and the matrix component comprising a second thermoplastic material. The structural component is a fabric formed from the structural fibers and the non structural thermoplastic fibers, the fabric comprising non structural thermoplastic fibers which are in fibre form in the final composite. The first and second thermoplastic materials differ as to their molecular weight or are dissimilar.

16 Claims, 6 Drawing Sheets

COMPOSITE

The present invention relates to a composite and a method of composite manufacture.

Composite materials generally comprise an array of reinforcing fibres in a resin matrix. The present global industries which utilise composite structures, for example the aerospace industry, predominantly use conventional unidirectional and fabric-based prepregs. Such prepregs are formed by making a unidirectional roving of reinforcing fibres, drawing the fibres through a bath of molten resin material and then drying the resin. The prepreg is then formed into a desired shape, loaded into a moult which is closed and heated to cure the resin.

Over the last five to seven years in an alternative technology for manufacturing composite parts has emerged which is generally termed liquid composite moulding. In liquid composite moulding, a dry fibrous reinforcement is loaded into a mould or tool and the resin is injected or infused into the fibres and cured.

The reinforcement is termed a "preform" which term is well known to those skilled in the art of composites as indicating an assembly of dry fibres that constitutes the reinforcement component of a composite in a form suitable for use in a liquid composite moulding process. A preform is typically an assembly of various textile forms such as fabrics, braids or mats, tailored or shaped as necessary, and is assembled as a specific operation prior to being placed into or on the mould tool.

Liquid composite moulding technologies, such as the RTM (resin transfer moulding), SCRIMP (composite resin injection moulding or vacuum infusion) methods are perceived by many to be the solution to the problem of making composite parts in a number of intractable situations, such as large aerospace primary structures and high volume structural automotive components. The benefits that liquid composite moulding technologies are perceived to offer over conventional prepregs are reduced scrap and lay-up time, non-dependence upon drape and increased shelf life properties.

However, liquid composite moulding does possess its own problems, particularly, when the end use applications require high toughness and where control of curing cycle time is critical.

Structural parts require a high degree of toughness for most applications and this is especially true of aerospace primary components. The solution to introducing high toughness in an aerospace grade composite has traditionally been to toughen the matrix—usually by the introduction of a second phase additive such as a thermoplastic polymer to the base epoxy resin matrix.

Various approaches have been employed for the addition of a thermoplastic material into the resin. The thermoplastic may be blended with the unreactive thermoset resin at elevated temperatures to produce a single phase, unreacted melt. A limitation of this approach is the level of thermoplastic that can be added to enhance toughness. High molecular weight thermoplastics are used but as these dissolve into the resin, the viscosity of the blend rises steeply. However the very nature of the injection process of the resin into the reinforcing fibres requires that the resins rheological properties, viscosity and elasticity are such as to allow infiltration of the resin throughout the fabric preform. This is essential if the resulting composite structure is to be free of voids and long injection times and high injection temperatures are to be avoided. Conventional toughened epoxies are extremely viscous systems which means that high pressures and massive tools are required with the necessity of heating the resins and difficulties in matching curing time and injection-fill cycles.

Thermoplastic may also be added in the form of a continuous solid film which is placed between two layers of fibre. In such processes the thermoplastic layer is generally known as the Interleaf layer. A process of this type is disclosed in European Patent Application No. 0327142 which describes a composite which comprises a solid continuous layer of a thermoplastic material placed between two layers of fibre impregnated with thermosetting resin. On heating the thermosetting layers and the interleaf layers remain as discrete layers.

A problem with the interleaf approach is that the solid thermoplastic film does not dissolve into the resin during the heat processing stage. As a result, although the final composite may show the desired increase in toughness, there is a weak resin-thermoplastic interface. The weak interface between the interlayer and matrix can cause poor resistance to cracking between plies especially when exposed to a moist environment.

Thermoplastic material may also be introduced in a powdered form. An example of this technique is disclosed in European Patent Application No. 0274899 where the thermoplastic material is either added to the resin before the prepreg is prepared or sprinkled onto the prepreg surface.

The use of powders presents a problem in that it is difficult to ensure that an even distribution of powder is supplied to the resin. There is therefore an uneven loading of the thermoplastic material with the result that the composite will have regions of different toughnesses. Furthermore, incorporation of powdered thermoplastic material in the resin is not suitable for liquid composite moulding techniques because the viscosity of the resin is increased when the particles are added to it according to standard Newtonian theory with all the consequent disadvantages as discussed above.

Whether the powdered thermoplastic is added to the resin or to the prepreg, the amount which can be incorporated is limited. Thus, so too is the toughening effect and, in general, to achieve a reasonable improvement in toughness, expensive structural thermoplastics have to be employed.

It has been proposed, in Japanese Patent Application 6-33329, to include thermoplastic in the form of fibres. The Application discloses a reinforcement fibre mix comprising 99.80% by weight of carbon fibres or graphite fibres and 1–20% by weight of thermoplastic resin. This approach is disclosed solely as useful in a classic prepreg technique.

A good composite is one having a combination of physical properties particularly suited to a specific application. The physical properties of the composite product are determined by, amongst other things, the physical properties of the solidified resin matrix material and the structural material, and the uniformity of distribution of the matrix material and the structural material in the composite. Best results are achieved where the matrix material is intimately in contact with all of the structural material.

It is therefore desirable that the resin matrix material is of such a consistency (viscosity) that it covers (wets) all of the structural material and, if necessary, fills the interstices formed in the structural material. Uniform wetting is particularly difficult to achieve where the structural material is of complex structure, for example where it is a preform, or where the ratio of the matrix material to support is particularly low.

The viscosity of the matrix material is affected by the number and types of additives. There therefore arises the problem that, although a liquid or a gel matrix material, comprising one or more additives may possess suitable physical properties when solidified, the viscosity of the liquid or gel matrix material may be too high to facilitate its even distribution around the support material, particularly where the support is complex. This results in a composite product lacking the physical characteristics expected.

Normally to achieve a good combination of properties a composite material will consist of a number of constituents. Typically for an aerospace grade prepreg there will be a high performance reinforcement preform combined with a complex polymeric resin matrix mix. This matrix mix normally consists of a thermosetting epoxy resin blended with various additives. These latter additives enhance the toughness of the basic resin. Such systems have complex flow characteristics and whilst they can be easily combined with fibres in a prepreg form, their use in other manufacturing techniques is limited. As for instance an attempt to use such a complex resin in an injection or resin transfer process in a complex fibre preform may result in the filtering out of additives and a non uniform product.

There is therefore a need for a method of composite manufacture which overcomes the above mentioned problems particularly for large complex structures.

EPA 0539 996 describes a fabric for lamination or moulding comprising reinforcing fibres such as carbon fibres and yarns of high and low molecular weight polyether either ketone resin. On application of heat, the low molecular weight yarns melt and enter the gaps between the fibres and the high molecular weight yarns.

In accordance with a first aspect of the present invention there is provided a composite comprising a first structural component and a second component, the structural component comprising structural fibres and a toughening additive comprising non structural fibres of a first thermoplastic material and the second component comprising a second thermoplastic material, wherein the structural component is a fabric formed from the structural fibres and the non structural thermoplastic fibres, wherein the fabric comprises non structural thermoplastic fibres which are in fibre form in the final composite, and wherein the first and second thermoplastic materials are different, characterised in that the second component is a matrix component formed by injecting the structural component with a liquid resin comprising the second thermoplastic material.

The term "structural fibre" as used herein refers to fibres which add to the strength of the ultimate composite such as glass or carbon fibres and which therefore have a modulus of elasticity greater than 50 GPa.

The term "non-structural fibre" as used herein refers to fibres which are not provided for increasing the strength of the ultimate composite as they have a modulus of elasticity less than 40 GPa. Thus known strengthening fibres formed from materials such as Kevlar are not non-structural fibres within the terms of the present Application.

The composite uses a thermoplastic resin as the matrix. The thermoplastic material may be expected to provide good chemical resistance and a degree of toughness in the final part. However, in order to achieve low viscosity which will be desirable if the thermoplastic resin is to be injectable, it may be necessary to reduce the molecular weight of the resin. Toughness of a thermoplastic is closely linked to the molecular weight such that a decrease in molecular weight will result in a decrease in toughness. It is therefore proposed that in addition to the use of a thermoplastic matrix, the composite is further toughened by the incorporation of thermoplastic fibres into the fibre preform.

Alternatively considered, the form of the reinforcement component enables a reduction in the toughening to be provided by the matrix resin thus allowing use of low viscosity systems. In other words, by providing for toughening of the composite by the fibres, the molecular weight of the thermoplastic resin can be made lower and so it may have a lower viscosity. This makes impregnation of large parts feasible with sensible pressures, lightweight low cost tooling and manageable cycle times. Furthermore a significantly greater amount of toughening additive can be included without compromising any of the processability aspects of liquid composite moulding techniques.

The thermoplastic fibres may be produced from a similar thermoplastic material to that of the matrix but with a higher molecular weight to introduce toughness. Alternatively, the fibres may be produced from a dissimilar thermoplastic material.

Combinations of thermoplastic fibres may also be used in order to achieve a mix of optimum properties. The properties of the composite will be dependent on the mechanical properties of the matrix, the additional thermoplastic fibres and the interfacial bonding between all components.

By toughening is meant the ability to absorb fracture, which may manifest itself in the ability to absorb impact. Such ability may be measured by suitable impact testing methods which will be known to the skilled man. Thermoplastic polymers are known to increase the ability to absorb impact energy in structural composites. By suitable formation of the fabric they may be dispersed throughout the final composite to give homogenous impact resistance.

In accordance with another aspect of the invention, there is provided a method of making a composite comprising forming a fabric from structural fibres and non structural fibres of a first thermoplastic material to provide a structural component, injecting a liquid resin comprising a second thermoplastic material into the structural component to provide a matrix component and setting the matrix component, wherein the first and second thermoplastic materials are different and wherein the liquid resin is injected at a temperature such that the final composite includes non structural thermoplastic fibres in fibre form.

The hybrid approach to the production of preforms for liquid composite moulding involves integrating the mechanism that provides toughening into the novel textile preforms rather than being an additive in a thermosetting resin. The net result of this is that the improved properties are achieved without compromising the manufacturability of the systems. This also has manufacturing benefits and in addition to providing a tougher part it also simplifies the manufacturing process and allows the potential for faster manufacturing make span times and hence greater tool utilisation. This has the further benefit of potentially reducing the most expensive element of a new composite programme: the up front investment required to meet rate production and hence provides the potential for lower cost entry into a new product programme.

Preferably, the toughening additive is a thermoplastic material whose latent heat of melting may absorb a proportion of the heat of the resin but which, upon completion of setting, reverts to its solid form without loss of toughening capacity. Alternatively, the thermoplastic resin and thermoplastic additive may be selected to allow absorption of some of the energy of setting in melting or phase change of the additive.

Injection of low viscosity resins can decrease the injection-fill part of the processing cycle. However, it is also desirable to decrease the remaining cycle time. By using very hot low viscosity thermoplastic resins, the injection-fill part can be accelerated but the risk is the generation of a long cooling cycle—particularly in thick parts, and also excessive heating, again particularly in thick parts, which could lead to a degraded, distorted or damaged final part.

A very rapid cycle can be affected without risking excessive cool-out times if semi-crystalline thermoplastic fibres are used as the toughening additive. Heat from the cooling of the thermoplastic matrix can be used to generate crystalline melting with the fibres. The latent heat of crystalline melting will absorb the excess energy thereby accelerating the cooling cycle and ensuring that it happens at a uniform rate within the bulk of the product thereby eliminating the potential for distortions to occur within the part. The selection of toughening fibres with appropriate crystalline melting temperature allows the cycle time to be minimised without risk of composite damage. The semi-crystalline fibres themselves will simply revert to their original condition on cooling and the process will not affect the ultimate toughness of the parts.

Preferred toughening additives include:— polypropylene, nylon 6, 6, styrene-butadiene, butadiene, polyether imide, polyethylketone, PET, polyether sulphone.

Preferably, the percentage by volume of the toughening additive in the final composite is more than 2%, more preferably, more than 5%, most preferably, more than 10%.

Preferably, the percentage by volume of the toughening additive in the final composite is not more than 50%, more preferably, not more than 40%, most preferably, not more than 30%. It is particularly preferred that the percentage toughening additive by volume in the final composite is not more than 25%.

The percentage by volume of structural fibres in the fabric is preferably at least 65%. The minimum value of 65% ensures that there is sufficient structural fibres to give the required strength. However the proportion of toughening fibres, that is, the thermoplastic fibres is high particularly in comparison to known methods in which thermoplastic is added in particulate form and so the toughening effect is commensurately much greater than that achieved with those known methods.

Preferably, the melt temperature of the toughening additive is not the same as the melt temperature of the resin component. It can be between 80–350° C., more preferably between 100–250° C., but its final selection will depend upon the parameters of the base matrix material.

The ability of the composite to be produced using a low viscosity resin will implicitly increase the rate at which a mould can be filled. However, the problem of controlling resin cycle times remains. A key factor always in thermoplastic resin injection is ensuring that the resin fills the mould and wets the reinforcement totally before it sets. However fill time and setting time are linked and the resin begins to set as soon as it leaves the injection port, and this process continues throughout the injection cycle.

In an alternative method, the injection and setting stages of the process are separated by incorporating the matrix thermoplastic resin in solid form into the preform. The resin may be in fibrous or particulate form. This has the benefit that the application of heat is all that is required to enable the matrix resin to flow and wet the part out and this will enable even greater convenience in the manufacturing process.

A further preferred feature is the use of a textile veil as part of a laminate by being sandwiched between layers of the structural component. The veil preferably has a greater absorbency rate and the structural component layer(s) either due to its thinness or the inherent absorbency or structure of the veil material or a combination of these characteristics. Accordingly, in some embodiments, it is preferred that a veil layer is provided sandwiched between the structural layers and provides means to increase the rate of filtration of resin into the structure. Advantageously, by this means, the resin may be preferentially directed into the centre of thicker structures than has hitherto been possible.

Advantageously, by the use of a fibrous veil, toughness and delamination suppression, are achieved with fibre bridging effects. However, preferably, the veil has a toughening additive incorporated therein to further enhance toughening of the composite. It is envisaged that the veil may also include thermoplastic fibres as a toughening additive. However, it is particularly preferred that when the veils are made by the papermaking route, the toughening additive is added in particulate form as this is particularly well adapted for use in the paper-making process.

Preferably, the matrix resin is a thermoplastic material with low viscosity such as an EMS Chemie Grilamid Polyamide 12.

The fibres may be continuous or discontinuous. If discontinuous, such as are produced by stretch breaking, they will be used in the form of a continuous yarn formed from the discontinuous fibres.

The structural component fabric may be woven or nonwoven and may comprise a hybrid yarn i.e. structural fibres and toughening fibres twisted in a hybrid yarn or the fabric may comprise structural yarn and toughening yarn mixed in a single fabric.

The basic concept of using hybrid yarns can be varied considerably. It is possible to replace all yarns in a textile with a hybrid yarn, or alternatively to replace a selection. Furthermore a large preform may consist of zones of conventional or toughened fabrics according to the needs of the part. This offers a processing advantage in that a single resin system can be used for a large part but the properties of the composite can differ in terms of toughness, and temperature capability from place to place—hence making one shot moulding of complex structures more feasible.

The properties of the composite can be varied widely by making the preform of different forms. For example, with a woven fabric the pattern in which the structural fibres and the thermoplastic fibres are provided will have an effect on the overall behaviour of the composite. The use of a structural reinforcement in the form of a textile therefore enables great versatility.

Embodiments of the present invention will now be further described with reference to the accompanying examples and drawings in which:

FIG. 1a shows a schematic laminar composite in accordance with the present invention;

FIG. 1b shows the upper layer of the laminar composite of FIG. 1a with a schematic impact region;

FIG. 1c shows the schematic construction of the upper layer of the laminar composite of FIG. 1a;

FIG. 1d shows an exploded schematic view of yield zone 2 shown in FIG. 1b;

FIG. 2a shows a hybrid veil sandwiched between two structural layers in a laminate;

FIG. 2b shows a possible construction for the hybrid veil of FIG. 2a;

FIG. 2c shows an alternative construction for the hybrid veil of FIG. 2a;

FIG. 1a shows a composite with a laminar structure of three superimposed identical flat rectangular layers: upper layer 3a; middle layer b and lower layer c. The internal structure is shown more clearly by FIG. 1c which is an explosion of inset 4. The explosion shows each layer is formed from a hybrid fabric comprising yarns of structural fibre, e.g. carbon fibre interspersed with yarns of thermoplastic fibre set in a thermoplastic resin matrix.

FIG. 1b and FIG. 1d show schematically the effect of an impact on the surface of the upper layer 3a. In particular, FIG. 1b reveals a series of diagonal linear yield zones from the theoretical impact and FIG. 1d shows an explosion of a linear yield zone 2 and reveals that the yield zone corresponds to a thermoplastic yarn extending in the composite layer.

Figure 1:
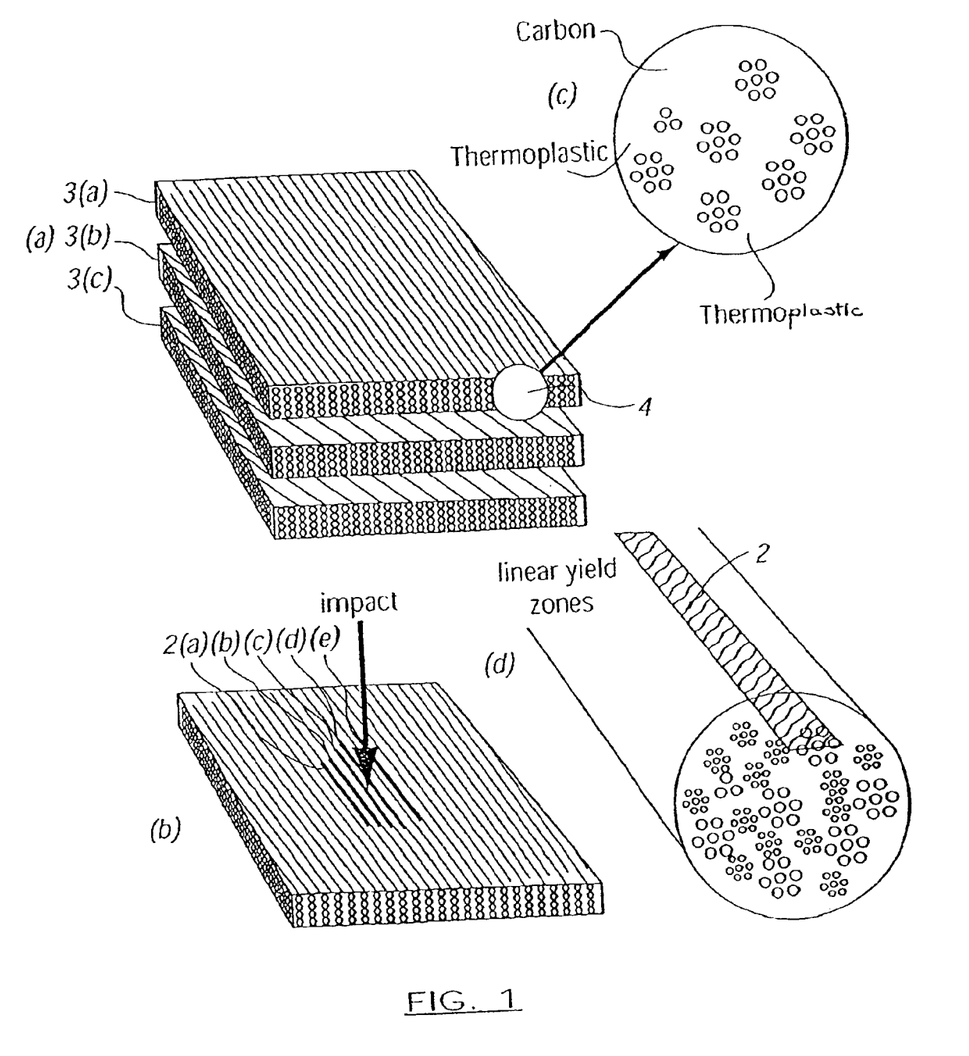
Figure 2:
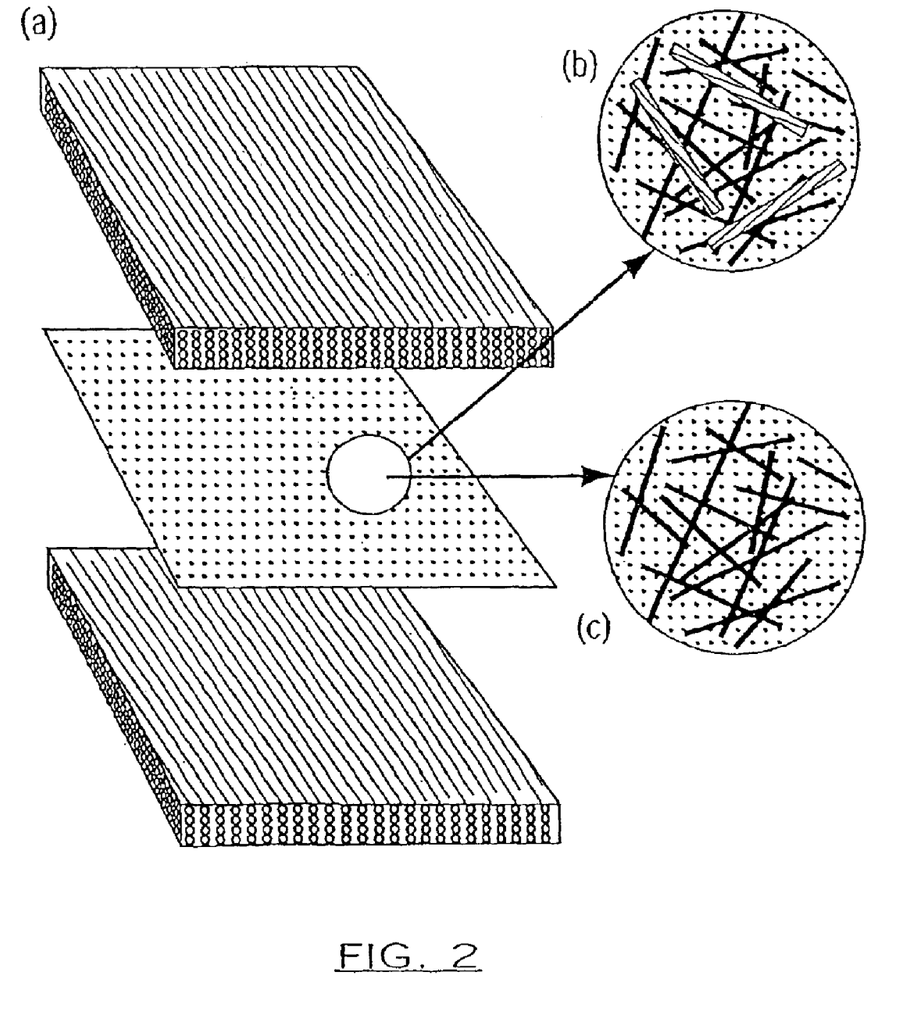

Referring to FIG. 2, this shows a schematic laminar composite construction similar to that of FIG. 1 but with a hybrid veil sandwiched between two layers of textile. The sandwiched veil introduces toughening into the textile composite. Two alternatives of the veil construction are shown in FIGS. 2b and c. FIG. 2b shows schematically the construction of mixed structural and non-structural fibres and thermoplastic powder whereas FIG. 2c shows a singular construction of carbon fibres and thermoplastic powder. In both cases the delamination resistance and some toughening is provided by fibre bridging between the textile layers and the fibrous veil. However this is greatly enhanced by the presence of thermoplastic in the veil layer.

By appropriate design of the interply veil, the resin flow rate across the veil may be enhanced relative to the flow rate across the upper and lower structural layers and thus improve the rate of injected resin impregnation into the composite.

There will now be described a number of examples of a composite having a structure as illustrated in FIG. 1 but employing a matrix of a thermosetting resin. The examples therefore serve to illustrate the effect of employing thermoplastic fibres as the toughening additive and so are illustrative of the invention even though not fully in accord with it.

The most dramatic benefits of the thermoplastic fibre toughening additive can be seen in the improved impact resistance of the composites. This is often illustrated by plotting the absorbed energy in through penetration impact tests as a function of volume fraction of fibres multiplied by thickness—a combination of parameters that yields a master curve for conventional composite systems irrespective of matrix type and detailed fibre orientation (assuming the fibres are arranged in a broadly in-plane isotropy or at worse a 0.90 arrangement). The master curve has been found to hold for materials with very different matrices, including brittle cold cure resins and tough thermoplastic matrices, such as polypropylene. Composites with the thermoplastic fibre toughening additive exhibit a surprising increase in toughness as shown by a considerable deviation from the master curve. This is also evidenced by greater damage allotment in the impact specimens.

EXAMPLE 1

A composite was prepared from a fabric preform that consisted of glass fibres commingled with polypropylene fibres in a quadriaxial non crimp fabric. The fabric was impregnated with a low viscosity unsaturated polyester resin and the laminate was cured at room temperature followed by a post cure at 80° C. in accordance with the resin supplier's specification.

The plate was 3 mm thick and the volume fractions of the three components as follows:— glass fibres 0.2 v/v;

polypropylene fibres 0.2 v/v; and polyester resin 0.6 v/v.

The laminate was subjected to a falling weight impact test to measure its energy absorption. The specific test configuration used produces absorbed energy results for glass fibre composites that fall in a master curve determined by the thickness of the laminate and the volume fraction of fibres. The energy absorbed by the laminate prepared from the preform with polypropylene fibres added as toughening agents was 100 J.

In contrast, a similar laminate produced from identical polyester resin 0.8 v/v but reinforced with a fabric that was totally produced from glass fibres of a fibre volume fraction of 0.2 v/v and a thickness of 3 mm absorbed an average of approximately 40 J. This demonstrates that addition of the thermoplastic fibres into the preform provides a considerable toughness benefit.

EXAMPLE 2

A glass fibre epoxy composite was prepared from a DGEBA epoxy resin (digylcidyl ether of bisphenol-A cured with an amine hardener [Shell Epikote 828 cured with Ciba HY932 aromatic amine]) and a plain weave woven fabric of E-glass fibres. The fabric occupied approximately 50% by volume of the composite. A similar composite was prepared with the same level of fabric but where the fabric component contained 70% (by volume) E-glass fibres and 30% by volume of a semi-crystalline polymeric fibre, with a crystalline melting temperature of 210° C.

The composites were produced by impregnating the fabrics and laminating to a thickness of 6 cm thick and cured in an oven set at 190° C. Thermocouples embedded in the centre of the laminate monitored the temperature rise in the materials as they initially equilibriated to the oven temperature and then experienced further temperature rises due to the exothermic curing process.

The laminate with just glass fibres exhibited a temperature rise well beyond the 190° C. oven temperature which became rapid and reached a peak value of 300° C. at which point significant degradation of the epoxy was observed. The laminate with semi-crystalline thermoplastic fibre also exhibited a temperature rise due to the exothermic cure but once this temperature reached the crystalline melting temperature of the thermoplastic fibres, the overall temperature rise was halted and the epoxy resin did not noticeably degrade.

EXAMPLE 3

A carbon fibre composite, 3 mm thick, was prepared from a plain weave fabric and an epoxy resin (digylcidyl ether of bisphenol A cured with an amide hardener [Shell Epikote 828 cured with Ciba HY932 aromatic amine]). The fabric contained 70% by volume carbon fibres (Torayca T300) and 30% by volume nylon 6.6 fibres. The fabric was impregnated with the liquid epoxy resin and cured at room temperature for 24 hours followed by a post cure at 100° C. for 4 hours. The cured laminate contained approximately 50% carbon fibres by volume and 21% of nylon fibres by volume. The remaining 29% of the composition was cured epoxy resin. A similar composite was prepared by impregnating a fabric produced exclusively from carbon fibres. In this case the plain weave carbon fibre occupied 50% of the volume of the composite and the epoxy resin matrix occupied the remaining 50%.

Both laminates were subjected to excess energy, falling weight impact tests. The laminate comprising just carbon fibres and an epoxy matrix absorbed 50 J of energy. The laminate with the carbon fibres, nylon fibres and epoxy matrix absorbed 85 J.

EXAMPLES 4 TO 7

Tests have been conducted with a series of medium volume fraction glass fibre composites which exhibit impact toughness (energy absorbed during drop weight impact with full penetration) which is enhanced by a factor of 2–3 times by inclusion of thermoplastic fibres in comparison to the unmodified analogues. Tests have also shown a remarkable lack of sensitivity to notches in open hole tension tests on the same materials.

Figure 3:
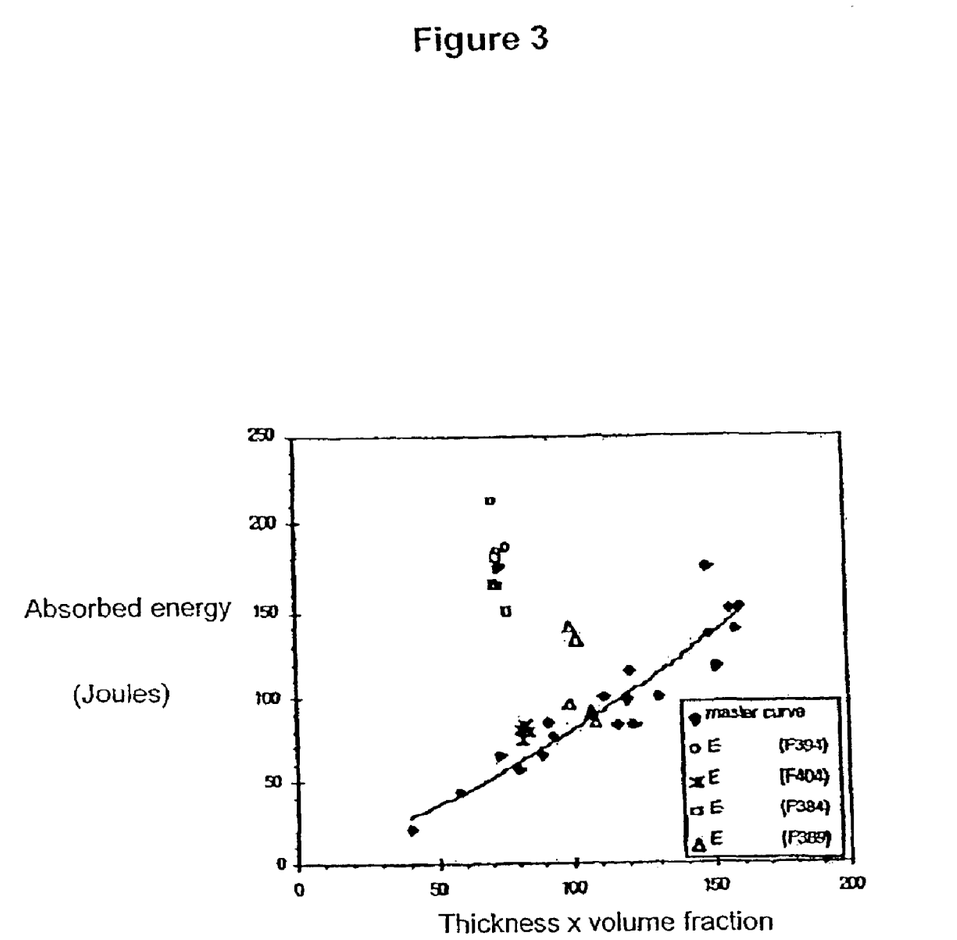
FIG. 3 shows absorbed energy versus volume fraction x thickness for various examples.

The impact results of two materials against two control samples are shown in FIG. 3 and Table 1 defines the materials tested.

TABLE 1

Comparison of toughened and non-toughened composite laminates.

| Examples | Product | % Volume Fraction Structural Component | Structural components |
|---|---|---|---|
| Example 4 | (F394) | 22–23 | Glass/polypropylene/polyester |
| Example 5 | (F404) | 41 | Glass/polyester |
| Example 6 | (F384) | 22–23 | Glass/polypropylene/polyester |
| Example 7 | (F389) | 25 | Glass/polyester |

The structural components each comprised about 50:50, glass to toughening additive, by volume.

FIG. 3 shows the impact results for the Examples 4–7 as a plot of absorbed energy against thickness x volume of fibres. The impact master curve for SMC (sheet moulding composite), GMT's (glass mat thermoplastics) and prepreg etc. has been superimposed for comparative purposes. The absorbed energy for the polypropylene and polyester containing composites is significantly improved by comparison with analogous composites having no toughening additive.

Figure 4:
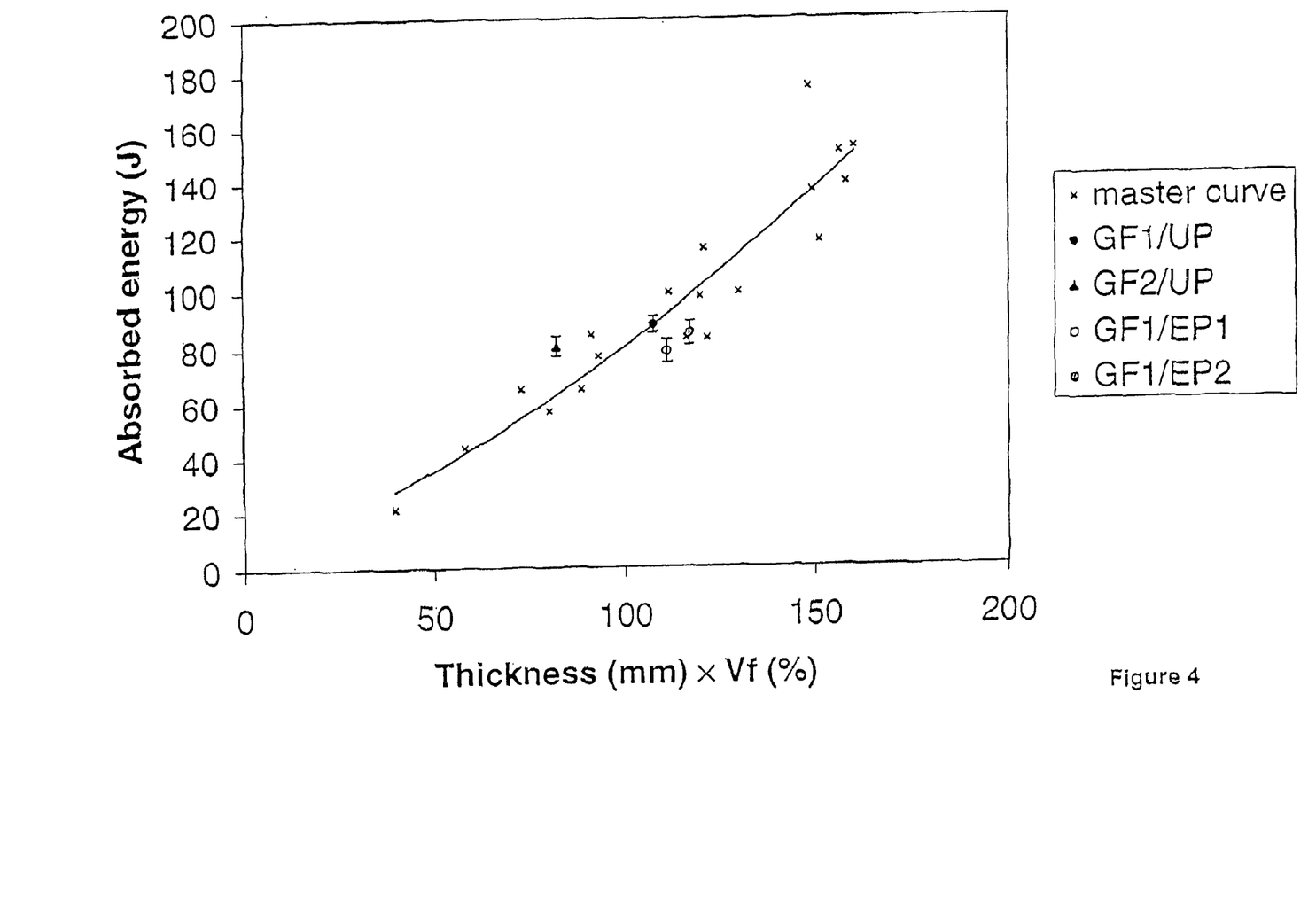
FIGS. 4 to 6 show plots of impact strength as a function of thickness x volume fraction of fibres for a composite formed from glass fibres alone, FIG. 4, glass fibres and polypropylene fibres, FIG. 5, and glass fibres and polyamide fibres, FIG. 6.
Figure 5:
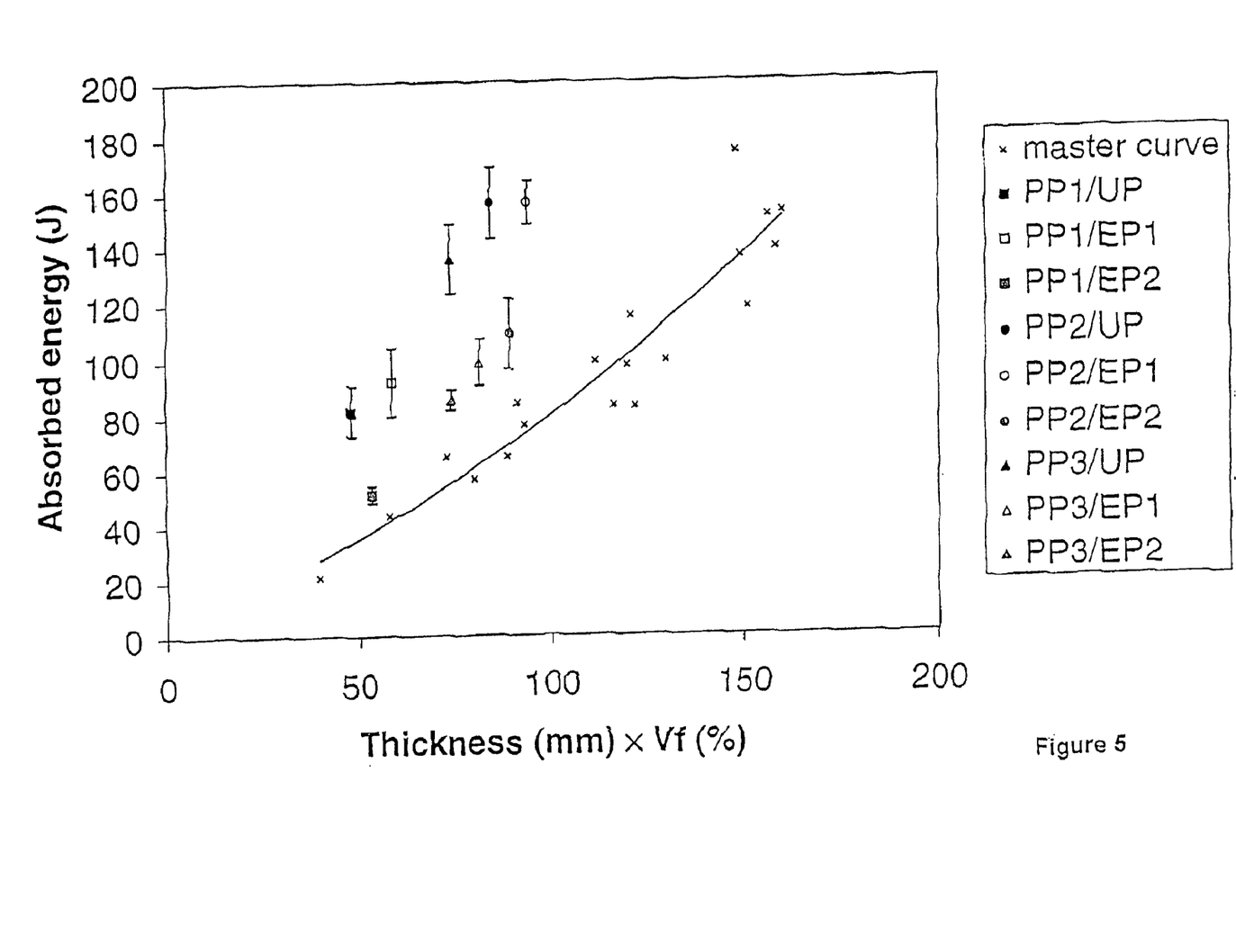
Figure 6:
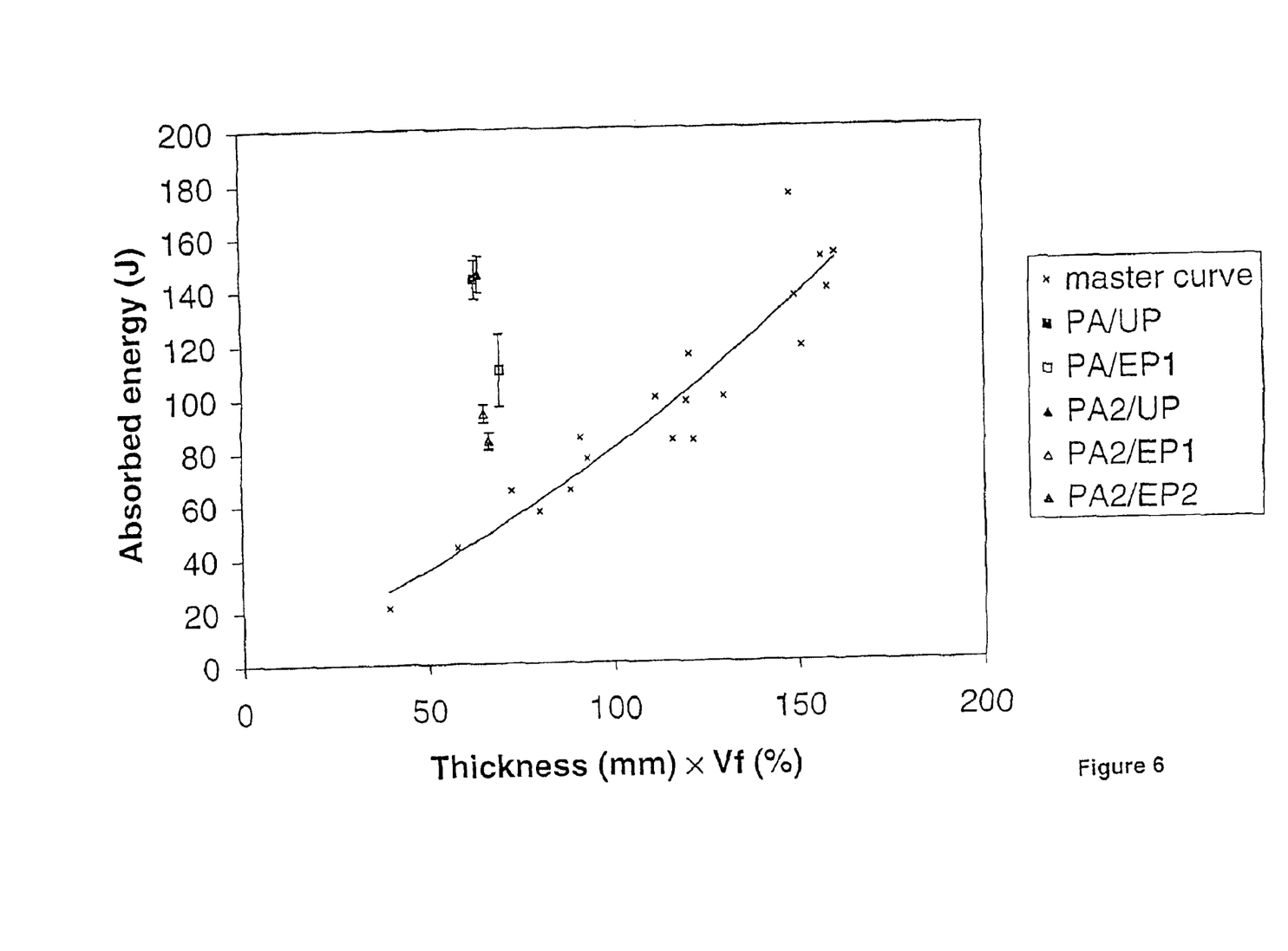

FIGS. 4 to 6 are plots showing impact strength, that is, energy absorbed during penetration, as a function of thickness x volume fraction of fibres. Each plot has data from three different thermoset matrices—two epoxies and a polyester. The first plot of FIG. 4 shows the results achieved when glass fibres alone are used with the volume fraction of glass fibres in the composite being between 30 to 50%. The second and third plots of FIGS. 5 and 6 show the results when the portion of the glass fibres is replaced by polypropylene, FIG. 5, and polyamide, FIG. 6. The plots demonstrate that the inclusion of the thermoplastic polymers provide significant benefits in terms of improved impact strength.

The resins used in the study which produced the plots of FIGS. 4 to 6 included an unsaturated isophthalic polyester resin (UP), Crystic 272 (a product of Scott Bader plc) and two epoxy systems, EP1 was a cold cure epoxy resin (digylcidyl ether of bisphenol A cured with an amide hardener (Shell Epikote 828 cured with Ciba HY932 aromatic amine) and EP2 was a low single-part, low-viscosity epoxy resin supplied by Cytec-Fiberite, Cycom 823, which was cured at 120° C.

The experimental procedure in all of these tests involved the use of an instrumented falling weight impact test in which a striker equipped with a 20 mm diameter hemispherical tip is allowed to fall onto a plate specimen of the test composite. The composite specimen is a thin plate, typically 3 mm thick, and 60 mm×60 mm in size which is simply supported on a steel ring with an internal diameter of 40 mm. The striker is dropped from a height of 1 m and has sufficient mass such that the kinetic energy is sufficient for the striker to completely penetrate the specimen. The test records the forces during the impact event and the energy absorbed is calculated from the force time record and the measured velocity of the striker as it impacts the specimen.

As noted in the discussion of the above examples, the use of thermoplastic fibres incorporated into the resin matrix provides a significant toughening effect. The thermoplastic fibres give a mechanism for plastic deformation and yielding which is not possible in an unmodified thermosetting resin. It has now been found that the same mechanism and so toughening effect is produced in a composite having a thermoplastic resin matrix which means that the effect is primarily fibre dominated. This makes it possible to form a composite having a thermoplastic resin matrix by a liquid composite moulding technique. The desirable qualities of a thermoplastic matrix, including good chemical resistance and contribution to toughness of the final part, can be obtained without wetting problems. The reason for this is that the presence of the toughening additives in the form of the thermoplastic fibres in a structural component means that a lower molecular weight thermoplastic can be used for the matrix than would be the case if the matrix was solely to provide the necessary toughness. A reduction in molecular weight results in a reduction in viscosity and therefore ready impregnation of the preform.

The fibre thermoplastic may differ from the matrix thermoplastic by molecular weight with a relatively higher molecular weight thermoplastic being used for the fibres and a relatively lower molecular weight thermoplastic for the matrix. This can be achieved by using two different thermoplastics or the same thermoplastic but of two different molecular weights. However, it should be noted that the fibre thermoplastic whilst having a higher molecular weight than the matrix thermoplastic does not have such a high molecular weight as to make the modulus such that the fibres are structural. There is no need to use materials such as Kevlar or other structural thermoplastics. Lower modulus, and therefore lower cost, thermoplastics will provide the necessary toughening effect.

The cycle time is key in modem manufacturing. The faster a tool is used, the greater the tool utilisation which reduces tooling costs and so upfront investment in a manufacturing program. Whilst the composite with a thermoplastic matrix and thermoplastic fibre toughening additive is preferably formed by a liquid composite moulding technique, tool throughput may be increased if another technique is employed which does not involve an injection step. One possibility would be combine the reinforcement component consisting of the structural and non-structural fibres with further thermoplastic fibres having a melting point lower than the thermoplastic fibres of their reinforcement component. The hybrid preform containing the three types of fibres: structural fibres and thermoplastic fibres of higher and lower melting points would be heated under pressure to cause the low melting point fibres to melt and impregnate both the structural fibres and the high melting point thermoplastic toughening fibres. For maximum efficiency, the tool would be heated to a temperature close to the lower melting point prior to positioning the hybrid preform therein.

The low melting point thermoplastic could alternatively be in powder form with identical processing being employed.

What is claimed is:

1. A composite comprising a structural component and a matrix component, the structural component comprising structural fibres and a toughening additive comprising non structural fibres of a first thermoplastic material and the matrix component comprising a second heat-curable thermoplastic material, wherein the structural component is a fabric formed from the structural fibres and the non structural thermoplastic fibres, wherein the fabric comprises non structural thermoplastic fibres which are in fibre form in the final composite, and wherein the first and second thermoplastic materials are different.

2. A composite as claimed in claim 1 wherein the first and second thermoplastic materials differ as to their molecular weight.

3. A composite as claimed in either claim 1 or claim 2 wherein the first and second thermoplastic materials are dissimilar.

4. A composite as claimed in any preceding claim wherein the matrix component is a low viscosity thermoplastic material.

5. A composite as claimed in any preceding claim wherein at least some of the thermoplastic fibres are semi-crystalline.

6. A composite as claimed in any preceding claim wherein the percentage by volume of the toughening additive is more than 2% but less than 50%.

7. A composite as claimed in any preceding claim wherein the volume of the toughening additive is more than 5% but less than 40%.

8. A composite as claimed in any preceding claim wherein the volume of the toughening additive is more than 10% but less than 30%.

9. A composite as claimed in any preceding claim wherein the structural component is provided in the form of a plurality of layers of fabric and at least one veil is provided between a pair of adjacent layers, the veil comprising a thin layer of woven or unwoven material.

10. A composite as claimed in any preceding claim wherein the volume fraction of the structural fibres in the fabric is at least 65%.

11. A composite as claimed in any preceding claim wherein the structural and/or non structural fibres are continuous or discontinuous.

12. A composite as claimed in any preceding claim wherein the fabric comprises a hybrid yarn of twisted structural fibres and thermoplastic fibres or yarn of structural fibres and yarn of thermoplastic fibres.

13. A method of making a composite comprising forming a fabric from structural fibres and non structural fibres of a first thermoplastic material to provide a structural component, injecting a liquid resin comprising a second thermoplastic material into the structural component to provide a matrix component and setting the matrix component, wherein the first and second thermoplastic materials are different and wherein the liquid resin is injected at a temperature such that the final composite includes non structural thermoplastic fibres in fibre form.

14. A method as claimed in claim 13 wherein the fabric is provided in layers and a veil is provided between at least one adjacent pair of layers prior to addition of the second thermoplastic material, the veil comprising a thin layer of woven or non-woven material.

15. A method as claimed in claim 14 comprising distributing binder material on or in the veil.

16. A method as claimed in any one of claims 13 to 15 wherein the resin injection process is resin transfer moulding or composite resin injection moulding.

* * * * *